US010949253B2

(12) United States Patent
Fletcher et al.

(10) Patent No.: US 10,949,253 B2
(45) Date of Patent: Mar. 16, 2021

(54) DATA FORWARDER FOR DISTRIBUTED DATA ACQUISITION, INDEXING AND SEARCH SYSTEM

(71) Applicant: Splunk Inc., San Francisco, CA (US)

(72) Inventors: Tristan Fletcher, Pacifica, CA (US); Brian Bingham, Denver, CO (US)

(73) Assignee: SPLUNK INC., San Francisco, CA (US)

( * ) Notice: Subject to any disclaimer, the term of this patent is extended or adjusted under 35 U.S.C. 154(b) by 154 days.

(21) Appl. No.: 16/118,185

(22) Filed: Aug. 30, 2018

(65) Prior Publication Data
US 2019/0146836 A1 May 16, 2019

Related U.S. Application Data

(63) Continuation of application No. 14/611,138, filed on Jan. 30, 2015, now Pat. No. 10,089,143, which is a
(Continued)

(51) Int. Cl.
*G06F 9/48* (2006.01)
*G06F 9/50* (2006.01)
(Continued)

(52) U.S. Cl.
CPC .......... *G06F 9/4881* (2013.01); *G06F 9/5005* (2013.01); *G06F 9/5011* (2013.01);
(Continued)

(58) Field of Classification Search
CPC .... G06F 9/4881; G06F 16/334; G06F 16/316; G06F 9/5005; G06F 9/5011; G06F 9/5033; G06F 9/54
See application file for complete search history.

(56) References Cited

U.S. PATENT DOCUMENTS 6,438,100 B1 8/2002 Halpern et al.
7,987,225 B2 * 7/2011 Kashyap ............... G06F 9/5072
709/201
(Continued)

OTHER PUBLICATIONS

Advisory Action dated Jun. 28, 2017, for U.S. Appl. No. 14/611,138 of Fletcher et al., filed Jan. 30, 2015.
(Continued)

*Primary Examiner* — Benjamin C Wu
(74) *Attorney, Agent, or Firm* — Perkins Coie LLP

(57) ABSTRACT

A scheduler manages execution of a plurality of data-collection jobs, assigns individual jobs to specific forwarders in a set of forwarders, and generates and transmits tokens (e.g., pairs of data-collection tasks and target sources) to assigned forwarders. The forwarder uses the tokens, along with stored information applicable across jobs, to collect data from the target source and forward it onto an indexer for processing. For example, the indexer can then break a data stream into discrete events, extract a timestamp from each event and index (e.g., store) the event based on the timestamp. The scheduler can monitor forwarders' job performance, such that it can use the performance to influence subsequent job assignments. Thus, data-collection jobs can be efficiently assigned to and executed by a group of forwarders, where the group can potentially be diverse and dynamic in size.

28 Claims, 8 Drawing Sheets

Related U.S. Application Data continuation of application No. 13/953,568, filed on Jul. 29, 2013, now Pat. No. 8,978,036.

(51) Int. Cl.

| | | |
|---|---|---|
| *G06F 16/31* | (2019.01) | |
| *G06F 16/33* | (2019.01) | |
| *G06F 9/54* | (2006.01) | |
| *H04L 29/06* | (2006.01) | |
| *H04L 29/08* | (2006.01) | |

(52) U.S. Cl.
CPC .............. *G06F 9/5033* (2013.01); *G06F 9/54* (2013.01); *G06F 16/316* (2019.01); *G06F 16/334* (2019.01); *H04L 63/08* (2013.01); *H04L 67/2861* (2013.01); *G06F 9/505* (2013.01)

(56) References Cited

U.S. PATENT DOCUMENTS

| | | | |
|---|---|---|---|
| 8,332,571 | B1 | 12/2012 | Edwards, Sr. |
| 8,978,036 | B2 | 3/2015 | Fletcher et al. |
| 9,054,950 | B2 | 6/2015 | Hathorn et al. |
| 9,473,397 | B2 | 10/2016 | Driever et al. |
| 9,807,192 | B1 | 10/2017 | Fletcher et al. |
| 10,089,143 | B2 | 10/2018 | Fletcher et al. |
| 2007/0282979 | A1 | 12/2007 | Tuel et al. |
| 2008/0072232 | A1 | 3/2008 | O'Toole |
| 2010/0088706 | A1* | 4/2010 | Dong .................... G06F 9/4887 718/103 |
| 2011/0078108 | A1* | 3/2011 | Kumar ................. G06F 16/2471 707/602 |
| 2011/0197065 | A1 | 8/2011 | Stauth et al. |
| 2011/0314092 | A1 | 12/2011 | Lunt et al. |
| 2012/0109937 | A1 | 5/2012 | Liensberger et al. |
| 2012/0197856 | A1* | 8/2012 | Banka ................. H04L 67/2885 707/706 |
| 2012/0253548 | A1 | 10/2012 | Davidson |
| 2013/0111469 | A1 | 5/2013 | B et al. |
| 2013/0173539 | A1 | 7/2013 | Gilder et al. |
| 2013/0239115 | A1 | 9/2013 | Kato |
| 2013/0259052 | A1 | 10/2013 | Akiyosh |
| 2013/0263136 | A1* | 10/2013 | Ohyama ............... G06F 9/5027 718/100 |
| 2013/0268650 | A1 | 10/2013 | Faitelson et al. |
| 2013/0318536 | A1 | 11/2013 | Fletcher et al. |
| 2014/0280742 | A1 | 9/2014 | Raja et al. |
| 2016/0034319 | A1* | 2/2016 | Gladkikh .............. H04L 67/141 709/228 |

OTHER PUBLICATIONS

Final Office Action dated Apr. 17, 2017 for U.S. Appl. No. 14/611,138 of Fletcher et al., filed Jan. 30, 2015.
Non-Final Office Action dated Aug. 2, 2017, for U.S. Appl. No. 15/582,542 of Fletcher et al. filed Apr. 28, 2017, 7 pages.
Non-Final Office Action dated Dec. 12, 2016, for U.S. Appl. No. 14/611,138 of Fletcher et al., filed Jan. 30, 2015.
Non-Final Office Action dated Feb. 27, 2018, for U.S. Appl. No. 14/611,138 of Fletcher et al., filed Jan. 30, 2015.
Notice of Allowance dated May 30, 2018 for U.S. Appl. No. 14/611,138 of Fletcher et al., filed Jan. 30, 2015.
Notice of Allowance dated Sep. 5, 2017, for U.S. Appl. No. 15/582,542 of Fletcher et al. filed Apr. 28, 2017., 6 pages.
Bitincka, L. , et al., "Optimizing Data Analysis with a Semi-Structured Time Series Database", In SLAML, '10, Jul. 31, 2013, 9 Pages.
Carasso, David , "Exploring Splunk—Search Processing Lanaguage (SPL) Primer And Cookbook", Apr. 2012, Apr. 2012, 156 Pages.
Welcome to Apache™ Hadoop ©, Welcome to Apache™ Hadoop ©, The Apached Software Foundation, [online], 2014, [Retrieved on Feb. 23, 2016], Retrieved from the Internet: <http://hadoop.apache.org>, 7 pages.
Non-Final Office Action dated Dec. 19, 2013, for U.S. Appl. No. 13/953,568 of Fletcher et al., filed Jul. 29, 2013.
Final Office Action dated May 6, 2014, for U.S. Appl. No. 13/953,568 of Fletcher et al., filed Jul. 29, 2013.
Notice of Allowance dated Nov. 12, 2014, for U.S. Appl. No. 13/953,568 of Fletcher et al., filed Jul. 29, 2013.

\* cited by examiner

DATA FORWARDER FOR DISTRIBUTED DATA ACQUISITION, INDEXING AND SEARCH SYSTEM

RELATED APPLICATIONS

This application is a continuation of U.S. patent application Ser. No. 14/611,138 filed on Jan. 30, 2015, which is a continuation of U.S. patent application Ser. No. 13/953,568 filed on Jul. 29, 2013 (issued on Mar. 10, 2015 as U.S. Pat. No. 8,978,036), each of which is incorporated by reference herein in its entirety.

TECHNICAL FIELD

The present disclosure relates generally to utilizing a scheduler to dynamically assign tasks to forwarders. The tasks can include collecting data from external sources and forwarding the data to other resources for processing.

BACKGROUND

The explosion of computing power and integration has led to a production of a continuous and massive quantity of electronic data. Such data can be reflective of computer communication or operations and/or for real-world happenings. Frequently, hidden amongst the data, are patterns that can be used to improve computer systems, business decisions, etc. The patterns can be more confidently determined and used when large amounts of data are available. However, collecting such data is itself an undertaking, especially in cases where data is to be collected from multiple complex sources. Each source can utilize different interface features, requiring data collection to be performed in a source-specific manner and making it difficult to predict how a data-collecting effort will progress. Thus, data collection is frequently surrounded by failed and prolonged attempts.

SUMMARY

In accordance with the teachings provided herein, systems and methods are provided for coordinating collection of data from complex sources. Specifically, a scheduler manages a plurality of data-collection tasks and assigns individual tasks to specific forwarders in a set of forwarders. The forwarder uses the information in the task to appropriately collect data from a respective source and forward it onto indexers for processing. For example, the indexer can then break a data stream into discrete events, extract a timestamp from each event and index (i.e., store) the event based on the timestamp. Forwarders alert the scheduler when a task has been completed. The scheduler assigns subsequent tasks appropriately, taking into account estimated forwarder loads and a bias towards assigning related tasks to a same forwarder. Due to variation in source capabilities, application programming interfaces and network function, it is difficult to predict how long any particular data-collection task will take. Nonetheless, techniques disclosed herein provide a responsive and dynamic strategy for effectively drawing from the processing power of a group of forwarders.

In some embodiments, a computer-implemented method is provided. A plurality of first jobs is identified. Each first job in the plurality of first job includes collecting data from an external source. Each first job in the plurality of first jobs is assigned to a forwarder in a set of forwarders. Each forwarder in the set of forwarders is configured to collect data from a source and transmit the collected data to an indexer to be processed and stored. For each first job in the plurality of first jobs, data detailing the first job is transmitted to the forwarder assigned to the first job. A communication is received from each of one or more forwarders in the set of forwarders. The communication is indicative of whether the assigned first job has been completed. A second job is identified. The second job includes collecting data. A forwarder of the set of forwarders is selected to perform the second job. The selection is based on the received communication. The second job is assigned to the selected forwarder.

Also provided, in some embodiments, is a system including one or more data processors; and a non-transitory computer readable storage medium containing instructions which when executed on the one or more data processors, cause the one or more processors to perform the method. Further provided, in some embodiments, is computer-program product tangibly embodied in a non-transitory machine-readable storage medium, including instructions configured to cause one or more data processors to perform the method.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The present disclosure is described in conjunction with the appended figures.

Like reference numbers and designations in the various drawings indicate like elements.

DETAILED DESCRIPTION

Figure 1:
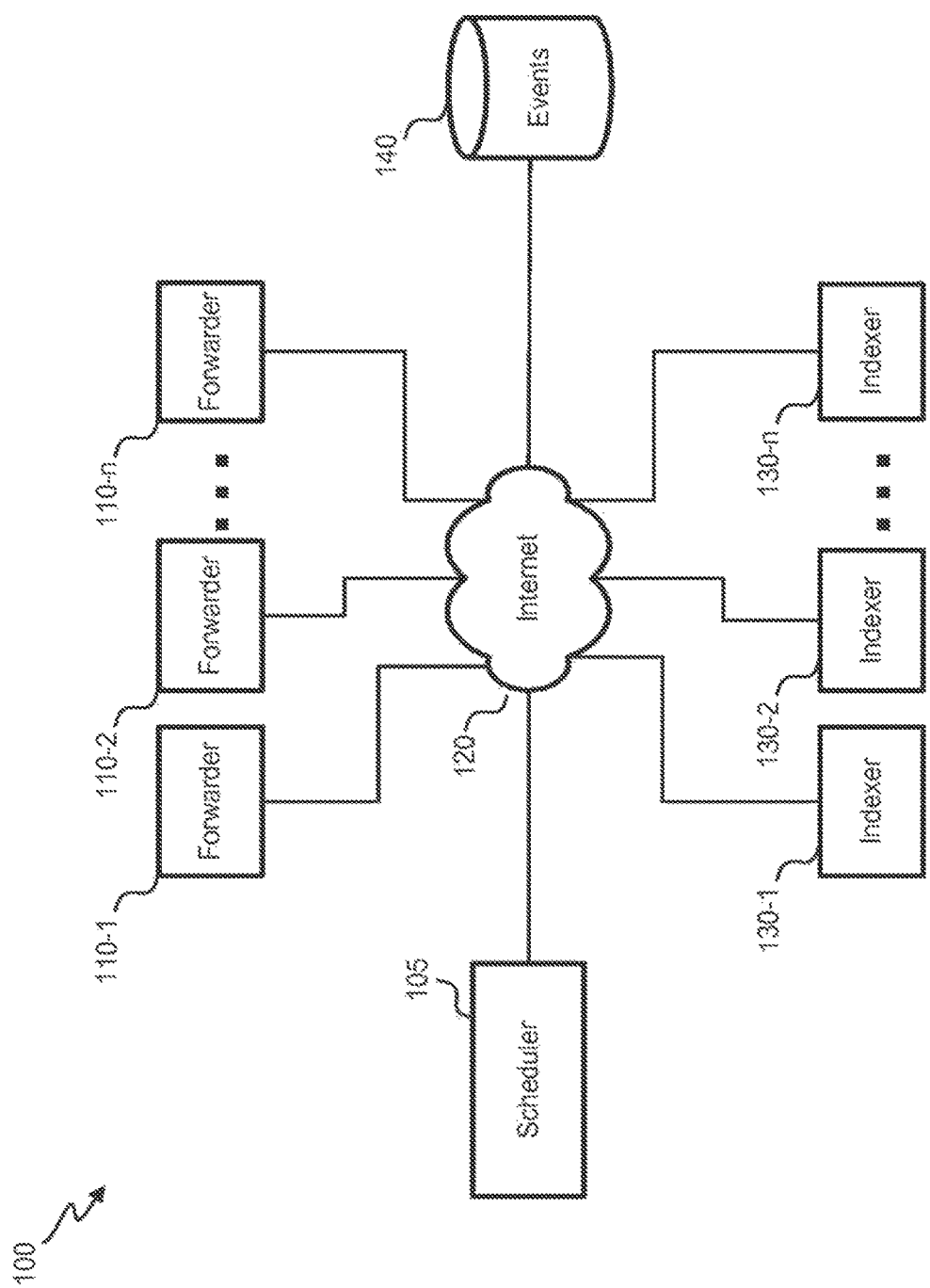
FIG. 1 shows a block diagram of an embodiment of a task performance interaction system.

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Traditionally, collecting data from complex sources required a client to develop a detailed plan for collecting the data prior to commencement of the effort. The client, e.g., identified a specific resource to use to collect data from a specific target. Information needed for the resource to initiate the collection action (e.g., identification of the target) was coded into a script, which was then loaded (in response to manual effort) onto the resource. In some instances, a client may determine that the single collection is inadequate and thereafter recruit the resource, which involves manually initiating loading of the script onto the additional resource.

In addition to the tedious nature of this initiation process, other drawbacks to the technique also influence its utility. For example, different tasks produce different load profiles on various data sources. It is therefore difficult to properly setup and maintain data input interfaces. Further, the focus on individual resources makes it difficult to ensure that a global data collection objective has been properly completed and that a particular data collection task was not performed by multiple resources. Similarly, if the information in the script becomes outdated, a client must then modify the script and individually re-load the script on each involved resource a laborious effort. Additionally, if a client wishes to adjust a number of resources involved in a collection effort, the client must individually address each involved node (e.g., to remove a script, add a script, etc.). Not only are many of these factors undesirable due to the time-commitment required from the client, but involvement of such manual effort can subject the system to errors.

Thus, as described in further detail herein, techniques provide a central scheduler that coordinates data collection performed across a set of forwarders (i.e., resources). The scheduler pushes appropriate secure credentials (e.g., including login information) and metadata (e.g., client-specified data-filtering and/or data-formatting parameters or other configuration information) to forwarders and assigns jobs to individual forwarders. The assignment can be made in an attempt to balance a task load across forwarders and/or to maintain assignment consistency across related tasks. The assignment can also be made based on capabilities of particular forwarders (e.g., a number of worker processes at the forwarder that can execute jobs in parallel). For each job, a configuration token (i.e., that identifies a data-collection task to perform and a target from which to collect the data) is generated and transmitted to the assigned forwarder. The data transmitted detailing each job can also include an identification of an indexer to which the corresponding forwarder is to send the collected data. At the forwarder, a representation of the job is added to a queue. Worker processes that execute jobs using a handler claim individual jobs from the queue. For a given job, a corresponding configuration token and stored metadata and/or credentials are used to form a configuration file for the job, and the job is then completed. The scheduler monitors the forwarder's job performance and can adjust future assignment strategies to bias assignments towards forwarders empirically able to handle jobs quickly relative to other forwarders. The scheduler can thus improve task-performance efficiency and easily manage even a large network of forwarders.

Referring first to FIG. 1, a block diagram of an embodiment of a task performance interaction system 100 is shown. Generally, a scheduler 105 distributes configuration tokens characterizing respective jobs to various forwarders 110. Initially, scheduler 105 pushes secure credentials and metadata (e.g., non-secure metadata) to each forwarder. The credentials can include one or more security features (e.g., username and password, a set of shared keys or another authentication method) needed to collect data from one or more particular sources or groups of sources. The metadata can include information pertinent to multiple jobs. For example, metadata can include client preferences, such as how to format a data output (e.g., xml or json), how to filter data from the target, a relative expiration deadline (i.e., defining a relative time (e.g., after job assignment) after which a forwarder should not commence job execution if not previously commenced) and/or other configuration information. As another example, metadata can include a data-request format required by a particular target. The credentials and/or metadata can be pushed upon initiation of operation or upon detecting a change to the credentials and/or metadata. Upon detecting that a new forwarder has been or will be added to a set of forwarders, the credentials and/or metadata can be pushed to the new forwarder. The credentials and/or metadata can be pushed over a network 120, such as the Internet, a wide area network (WAN), local area network (LAN) or other backbone. Forwarders then store the credentials and/or metadata in data stores.

Scheduler 105 accesses a workload, which defines specific data collection to be performed. The workload can identify one or more targets from which to collect data, which may be internal or external to a system supporting schedule 105. The targets can include, e.g., programming interfaces, scripting engines or data stores. The workload can include features or a feature set based on input from a client. For example, a client can specify a metric of interest.

Scheduler 105 can break the workload into discrete jobs. Scheduler 105 further generates a configuration token for each job, such that the token includes the information necessary to perform the job, excluding information included in previously transmitted credentials and/or metadata. Thus, the initial transmission of credentials and/or metadata allows for more frequent job-defining transmissions (with configuration tokens) to be of smaller size and inclusive of less secure information.

A workload can include an overall time-extended data-collection objective. That is, a workload can include a collection task and a corresponding collection schedule. For example, a workload can indicate that website-access log data is to be collected daily at 12 pm ET from source #1 from Sep. 1, 2013 until Sep. 1, 2014. Scheduler 105 can identify a number of discrete jobs based on the token, e.g., each pertaining to a day. A workload can further include a collection configuration that includes a pairing of a task with multiple targets. Scheduler 105 can then create a job for each target.

Scheduler 105 assigns each job or a batch (that includes a set) of jobs to a forwarder from a set of forwarders 110. The assignment can be made based on a load (e.g., biasing an assignment to a forwarder with a smallest load). For example, the assignment can be made to attempt to reduce inter-forwarder differences in a queue of pending jobs. The assignment can also or alternatively be made based on a capability present for each forwarder in the set (e.g., biasing an assignment to a forwarder with a best capability or best-matched capability). In one instance, the assignment is biased towards forwarders with a high number (compared to other forwarders) of worker processes (detailed further below). The assignment can also or alternatively be biased towards assigning the job to a forwarder that was previously assigned a related job. This can allow the forwarder to utilize information previously cached to allow the forwarder to, e.g., detect changes in the data quicker.

A set of worker processes can operate on each forwarder. The worker processes can operate in functional parallel (dividing system-resource use across time blocks) or actual parallel. A number of worker processes operating on a given forwarder can be fixed or set based on input from a client. In some instances, biasing an assignment based on load and/or capability can account for a number of worker processes operating on each forwarder (e.g., attempting to minimize inter-forwarder differences in a number of pending jobs per worker processor). A worker process can use one or more handlers, each of which can execute a particular type of job. Thus, assignments are made based on handler accessibilities on various forwarders, to ensure that an assigned forwarder can use the appropriate handler to execute a given job. Uneven handler presence across forwarders may allow a client or system to ensure that a certain job group is consistently assigned to a same forwarder or a forwarder in a defined group of forwarders.

In some instances, jobs are grouped into batches, such that a batch includes a set of jobs (e.g., 1-10 jobs) and a workload includes a set of batches. A number of jobs per batch can be determined based on a number of processes at a forwarder and a length of the jobs. For example, scheduler 105 may attempt to equalize a number of tasks currently assigned per worker process. Thus, e.g., if forwarder #1 has one worker process and forwarder #2 has five worker processes, assigning two jobs to forwarder #1, and ten jobs to forwarder #2 would balance an overall tasks-per-worker-process at 2 for each forwarder. It will be appreciated that reference herein to assignment of a task can therefore be alternatively applied to assignment of a batch.

Upon determining the assignment, scheduler 105 securely transmits the configuration token to the forwarder. The transmission can occur over network 120. In the instance where jobs are grouped in a batch, a batch of configuration tokens can be transmitted to the forwarder. For each received configuration token (e.g., received or present in a received batch), an identification of the token or job can be added to a queue at the forwarder.

The assigned forwarder 110 can send a confirmation of receipt to scheduler 105 upon receiving the configuration file. In some instances, no receipt confirmation is required. In this case, communication may be unidirectional (with respect of which component initiates a communication from a networking perspective), such that a forwarder—while it can respond to a scheduler request—cannot initiate communication with the scheduler. This feature can reduce network load and improve network security. If a forwarder could initiate communication (meaning that it would typically have a scheduler's credentials, compromise of one forwarder would compromise the whole system.

Forwarder 110 can use the configuration token, stored metadata and stored credentials to identify complete details needed to execute a job. For example, a configuration token may identify a task and target identifier. Forwarder 110 may search for credentials and/or metadata associated with the target identifier (e.g., that identify an IP address, communication format, security requirements, etc.) and combine the information from the search with that from the configuration token to result in all information needed to complete the task.

Worker processes with availability to execute a job claim jobs from the queue. In one instance, the job claimed is always the job at the front of the queue (where new jobs are added to the back of the queue). The worker process then uses an appropriate handler to execute the job. Execution of the job can include establishing or maintaining a secure communication channel with a target identified in the job and requesting and receiving data from the target. The job can further include filtering and/or formatting the data. The data received from the target can include structured or unstructured data and may include machine data or data from web-access logs. The target can include a virtual or non-virtual machine. In some instances, the target includes a server, such as a web server. The collection can be performed in compliance with any other restrictions identified in the job (e.g., being selective for data of a specific type).

The forwarder can then transmit the collected data (e.g., over a network 120) to an indexer 130. As described in greater detail below, indexer 130 parses the data into events and extracts a timestamp from each event. Indexer 130 stores the events in event data store 140, indexing the events based on the timestamps. As described in further detail below, a search engine can then access select events from event data store 140 to retrieve data elements from the events that are responsive to a given search query (e.g., generated based on input from a client).

Figure 2:
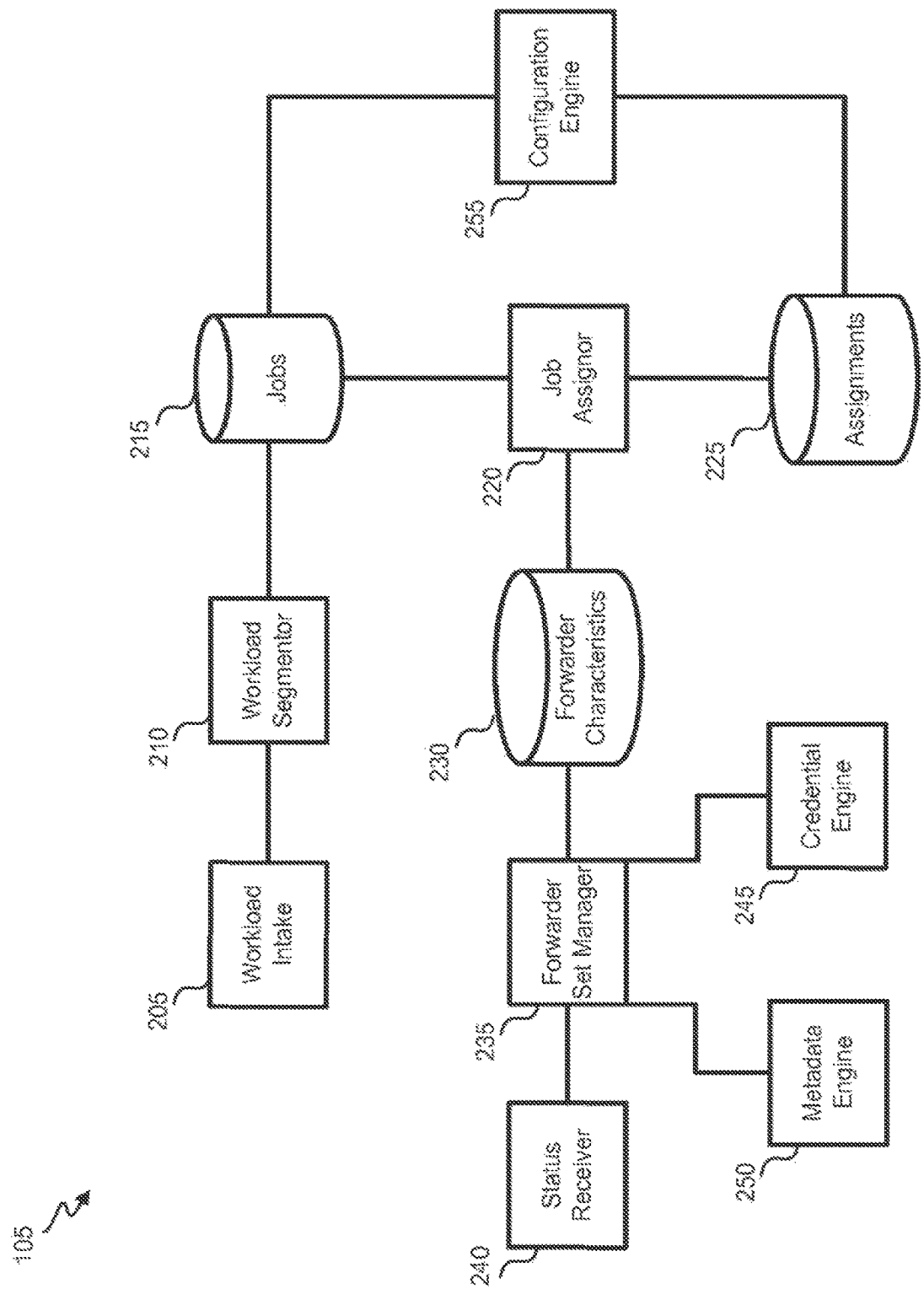
FIG. 2 shows a block diagram of an embodiment of scheduler.

Referring next to FIG. 2, a block diagram of an embodiment of scheduler 105 is shown. Scheduler 105 can be, in part or in its entirety, in a cloud. In some instances, at least part of scheduler 105 is present on a device, such as a client device. Scheduler 105 can include a distributed system.

A workload intake 205 can receive a workload. The workload can be received from or generated based on input from a client. The workload can include actions to perform and/or a schedule for performing the job. The job can identify a target from which to collect data. Other detail, such as a data type to collect, an expiration time, and a start and/or stop time for collection can also be present.

A workload segmentor 210 segments the workload into individual jobs. Each job can include one or more tasks and one or more targets. The segmentation can be performed such that each task pertains to achieve a relatively fixed work effort for each job and to achieve jobs that can be completed quickly enough to adjust assignment decisions based on completion results. For example, a year-long data collection workload can be divided into jobs pertaining to individual days in the year. Workload segmentor 210 further generates, based on the workload and for each job, a configuration token that identifies a task to perform and a target. The configuration tokens are stored in a job data store 215.

A job assignor 220 assigns individual jobs to particular forwarders. The assignments are stored in an assignment data store 225, and can include, for each assignment, a job identifier and a forwarder identifier. Job assignor 220 can consult a forwarder characteristic data store 230 for information about available forwarders to influence the assignment. Forwarder characteristic data store 230 can identify forwarders in a set of forwarders that receive assignments from scheduler and data store 230 can include information about an estimated load on each of one or more forwarders and/or capabilities on each of one or more forwarders.

A forwarder set manager 235 can maintain forwarder characteristic data store 230, such that manager 235 appropriately updates forwarder characteristic data store 230 to remove or add characteristics of a forwarder upon removal or addition of the forwarder from a set receiving assignments. Further, forwarder set manager 235 can automatically detect or be informed (e.g., via input from a client) of a given forwarder's capabilities (e.g., handlers, number of worker processes, etc.) and ensure that forwarder characteristic 230 reflects real-time data in this regard. Forwarder set manager 235 can further update forwarder characteristic data store 230 to include data pertaining to a current load on a forwarder (e.g., a number of jobs pending, a time that a last job was completed and the job identifier, a standardized job-completion time, etc.). In some instances, this data can be determined based on communications received by a status receiver 240 from forwarders. The communications can be responsive to a status request from forwarder set manager 235 and can include, e.g., an indication that a specific job has been completed or a progress indication.

A credential engine 245 ensures that current credentials are present on all forwarders in a desired set of forwarders and no others. The credentials can include passwords (or other security features necessary to establish desired communications) or other secured information. If one or more credential changes, credential engine 245 causes the updated credentials to be pushed to all forwarders. If a new forwarder is added to the set, credential engine 245 causes previous credentials to be wiped and pushes the current credentials to the forwarder.

A metadata engine 250 ensures that current metadata are present on all forwarders in a desired set of forwarders and no others. The metadata can include general, target-specific and/or client-specific unsecure information, such as formatting specifications, filtering specifications or execution specifications (e.g., including expiration timelines). In some instances, metadata includes details for each of a set of tasks (e.g., "Task 2: collect web-access log data and filter for "GET" events). Subsequent jobs can then merely refer to the task identifier to identify a job to be performed. If one of or more metadata changes, metadata engine 250 causes the updated metadata to be pushed to all forwarders. If a new forwarder is added to the set, metadata engine 250 causes previous metadata to be wiped and pushes the current metadata to the forwarder.

A configuration engine 255 generates, for each job, a configuration token. The configuration token can include information required for a forwarder to complete a job beyond information in previously transmitted metadata or credentials. Configuration tokens can include a task or task identifier and as an identification of the target. Configuration engine 255 then transmits the configuration file to the assigned forwarder. Job assignor 220 can then transmit individual configuration tokens to forwarders or can group them into batches (e.g., to reduce a number of transmissions and/or to allow quantities of job assignments to match forwarders' capabilities) and transmit the batches.

Figure 3:
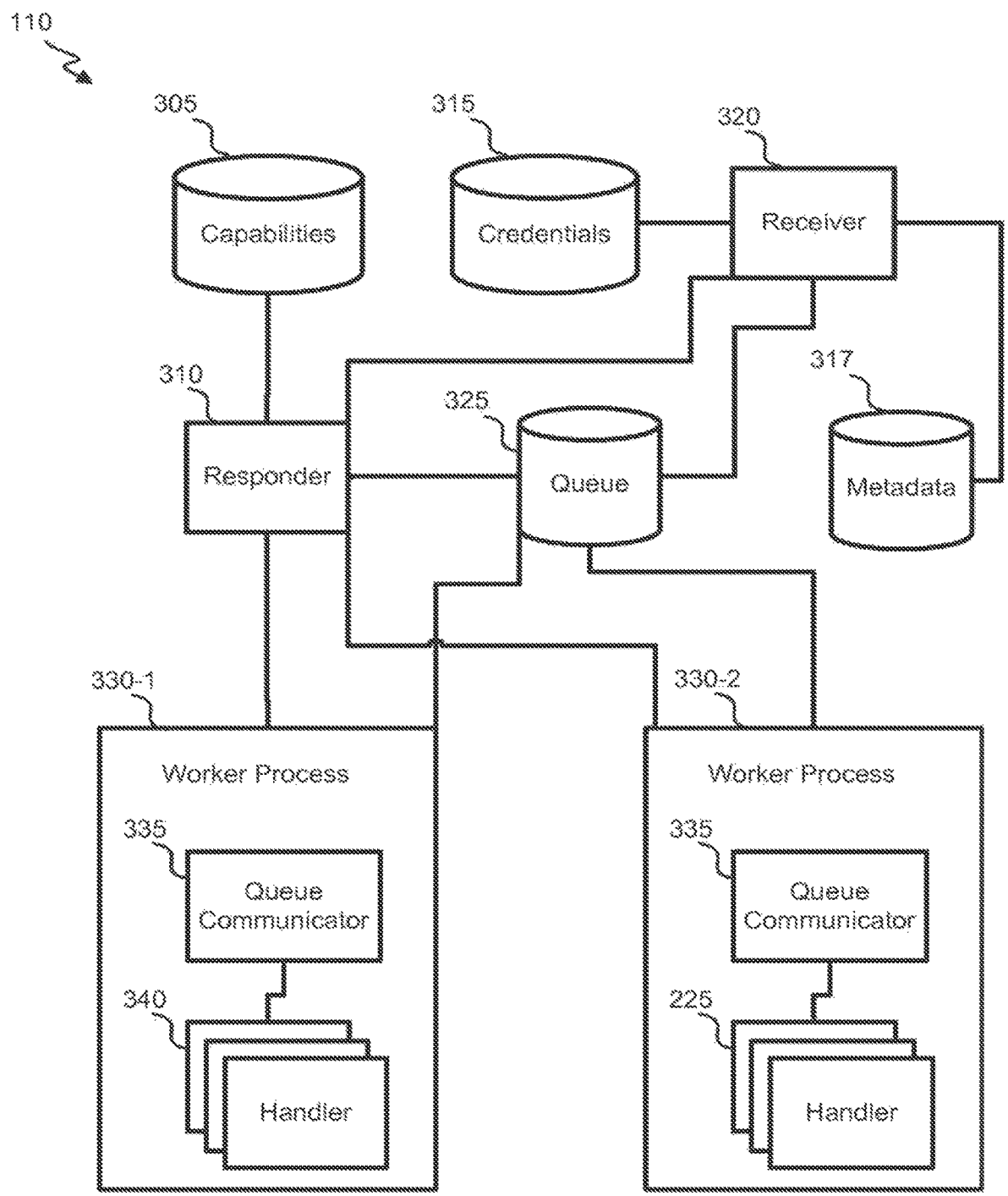
FIG. 3 shows a block diagram of an embodiment of forwarder.

Referring next to FIG. 3, a block diagram of an embodiment of forwarder 110 is shown. Forwarder 110 can be, in part or in its entirety, in a cloud. In some instances, at least part of forwarder 110 is present on a device, such as a client device. Forwarder 110 can include a distributed system.

Forwarder 110 includes a capabilities data store 305 that identifies the hardware and/or software capabilities of the forwarder. The capabilities can identify, e.g., a number of worker processes, a number of handlers, and/or a presence of specific handlers able to execute specific types of tasks. A responder 310 can report the capabilities to scheduler 105 (e.g., via a secured connection). The capabilities can be reported, e.g., on start-up, upon detecting a change or at regular intervals. Based on the capabilities and/or other factors, scheduler 105 may assign jobs to the forwarder.

In order to perform a task, typically, forwarder 110 may need information about how to communicate with a target, such as login information or other security information. A credential data store 315 stores this information. Forwarder 110 may further need data collection and/or transmission specifications, such as filtering to apply, formatting to use or other configuration information. A metadata data store 317 stores this information. The credentials and metadata can be received, via a receiver 320, from scheduler 105 at start-up, upon a change of the credentials or metadata (e.g., thereby causing one or both to be transmitted from scheduler 105) and/or when forwarder 110 joins a set of forwarders.

Receiver 320 can also receive indications of assigned jobs (e.g., identifying a target and/or other pertinent data-collection information). These indications can be included in configuration tokens. In some instances, a batch of configuration tokens is received. Receiver 320 can store information pertaining to jobs (e.g., corresponding to each received job and/or each job identified in a batch) n a queue 325. In some instances, receiver 320 adds the information for each new task to a back of queue 325.

Within a given forwarder, one or more worker processes 330 can exist to execute tasks. While two worker processes are shown in FIG. 3, it will be appreciated that fewer or more worker processes may alternatively exist or exist on other forwarders. Each worker process 330 includes a queue communicator 335 that (e.g., at regular intervals or upon completing a task) accesses queue 325 and claims a task. The claimed task can be the task at the front of the queue.

Within the worker process, a handler equipped to execute the task, executes the task. While not shown, worker processes 330 can access the information in credentials data store 315 and/or metadata data store 317 to form a complete configuration file for each job. Queue communicator 335 informs responder 310 of a progress of the task completion, and responder 310 can then appropriately respond to status requests from scheduler. In some instances, a completed progress can be implicitly reported by claiming a new task. The progress may be sent, e.g., upon task completion or at defined time points or intervals.

Figure 4:
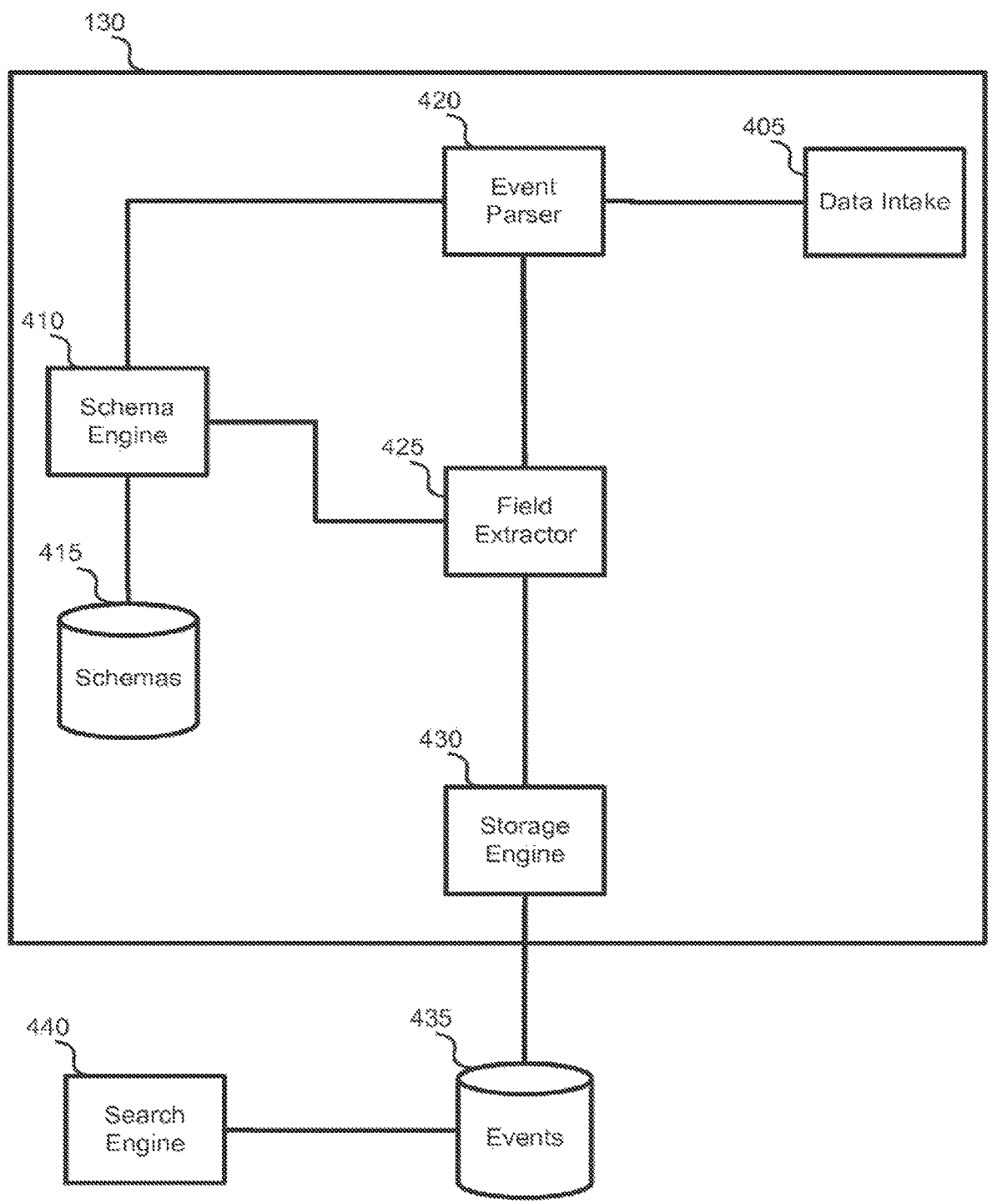
FIG. 4 shows a block diagram of an embodiment of an indexer in relation to a search engine.

FIG. 4 shows a block diagram of an embodiment of an indexer 130 in relation to a search engine 440. Data intake 405 receives data, e.g., from a forwarder 110. The data can include automatically collected data. In some instances, the data includes a structure that allows for individual events and field values within the events to be easily identified. The structure can be predefined and/or identified within the data. For example, various strings or characters can separate and/or identify fields. As another example, field values can be arranged within a multi-dimensional structure, such as a table. In some instances, data partly or completely lacks an explicit structure (e.g., thereby being unstructured data). For example, in some instances, no structure for the data is present when the data is received and instead is generated later. The data may include a continuous data stream can include multiple events, each with multiple field values.

A schema engine 410 identifies an applicable schema that can be used to extract specific field values by imposing structure on data. Specifically, a schema can be "bound" to data, by breaking a data stream (e.g., a byte stream) into events and/or extracting field values, such as a time stamp. Schema binding can occur while receiving data, prior to storing data, while storing data, while processing data, while retrieving data, while responding to a search query or some combination of the above (e.g., separating data into events at intake and extracting field values from events while responding to a search query). Late binding schema can be used, which imposes structure on the data at query time rather than at storage or ingestion time.

Schema engine 410 can itself estimate a schema or can determine a schema based on input from a client or data provider. The input can include the entire schema or restrictions or identifications that can be used to estimate or determine a full schema. Such input can be received to identify a schema for use either with structured or unstructured data and can be used to reliably extract field values. The schema can be estimated based on patterns in the data (e.g., patterns of characters or breaks in the data) or headers or tags identifying various fields in the data, such as <event><message time>2014.01.05.06.59.59</> . . . </>). Schema can be received or estimated in a variety times, including (in some instances) any time between receipt or indexing of the data and a query time. The time that the schema is actually received or estimated within the receipt-to-indexing time period may be determined based on a setting or system load. Schema engine 410 can perform the schema estimation once or multiple times (e.g., continuously or at routine intervals). Once a schema is determined, it can be modified (e.g., periodically, at regular times or intervals, upon receiving modification-requesting input, upon detecting a new or changed pattern in the input, or upon detecting suspicious extracted field values (e.g., being of an inconsistent data type, such as strings instead of previously extracted integers)). In some instances, a client or data provider can provide input indicating a satisfaction with or correction to estimated schema. Received or estimated schemas are stored in a schema data store 415.

Using the schema, an event parser 420 can separate the received data into events. For example, event parser 420 can separate data between particular start and stop tags, or separate data within a table's row, or separate data within particular character numbers in the data. Also using the schema, a field extractor 425 can extract various field values. In some instances, field extractor 425 further attaches a semantic meaning to the extracted field values (e.g., based on a length and/or character types of the field values). Field extractor 425 can further convert field values into a particular (e.g., standard or easily searchable) format.

A storage engine 430 can store data in an event data store 435. It will be appreciated that event data store 435 can include multiple data stores or sub-data stores. Event data store 435 can be stored in working, short-term and/or long-term memory. In various instances, event data store 435 can include raw data, extracted events or extracted field values. It will be appreciated that, in some instances, part of the data received by data intake 405 can be deleted or not stored (e.g., field breaks).

Events and/or field values can be stored at locations based on a field value. For example, a field value identifying a message sender may be stored in one of ten data stores, the data store being chosen based on a message time. In some instances, rather than grouping various data components at specific storage areas, event data store 435 includes an index that tracks identifiers of events and/or fields and identifiers of field values. Thus, for example, the index can include an element for "Data type="webpage request" (indicating that the element refers to a field value of "webpage request" for the field "data type") and then list identifiers for events with the field value (e.g., "Events 3, 7, 9 and 16"). Selective storage grouping can be referred to as storing data in "buckets". Bucket definitions can be fixed or defined based on input from a data provider, client or client. Input and/or automatic rules can be used to add, merge or delete buckets.

In some instances, a time-series data store is used, such that events and/or field values are stored at locations based on a timestamp extracted from the events. This can allow events with recent timestamps (e.g., which may have a higher likelihood of being accessed) to be stored at preferable memory locations that lend to quicker subsequent retrieval. Further, parallel processing can then be performed, with each process operating on a different time bucket.

A search engine 440 (which can correspond to search engine 220) can subsequently access and search all or part of event data store. The search can be performed upon receiving a search query from a client, user or client, or the search can be performed periodically and/or at defined intervals or times. Segregation of data into events and/or fields can allow for more efficient searching. The search may include, e.g., a request to return all events or identifiers of all events having a value for a field meeting a criterion. To illustrate, search engine 440 can retrieve all events having a timestamp within a defined time period, or all events having a first field value (e.g., HTTP method) set to a specified value (e.g., GET).

The search may include, e.g., a request to return values for one or more first fields for all events having specified values (e.g., specific values or values within a specific range) for one or more second fields. To illustrate, search engine 440 can retrieve all URLs in events having a timestamp within a defined time period, or all events having a first field value (e.g., HTTP method) set to a specified value (e.g., GET).

In some instances, upon retrieving the event data of interest, search engine 440 may further process the results. The processing may be performed based on an individual value (e.g., to obtain a length or determine if an extracted field value matches a specified value). In some instances, processing can be performed across values, e.g., to determine an average, frequency, count or other statistic. Search engine 440 can return the search result to a client or user, e.g., via an interface (such as a web interface or app interface) or email.

Figure 5:
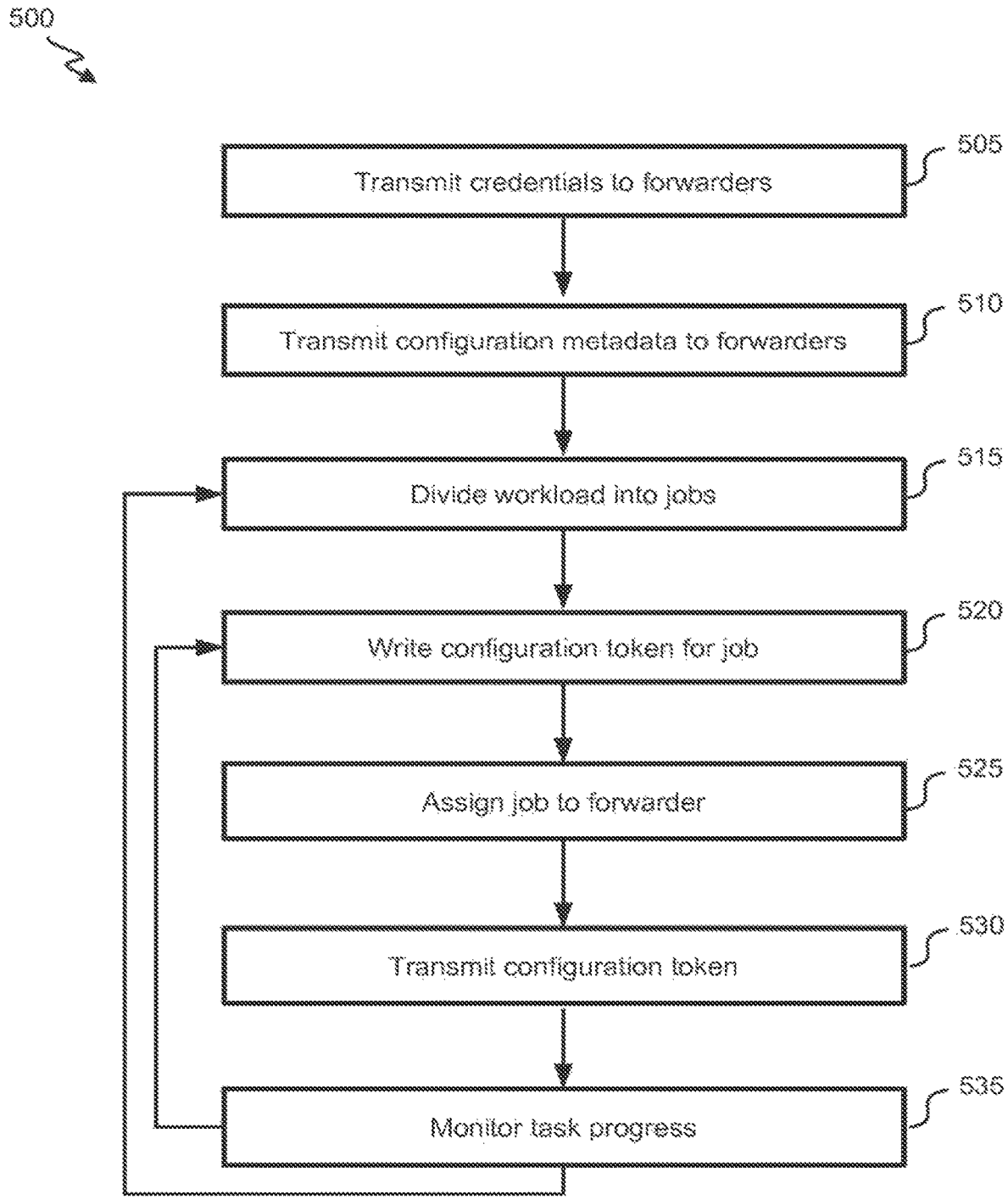
FIG. 5 illustrates a flowchart of an embodiment of a process for assigning jobs to forwarders.

FIG. 5 illustrates a flowchart of an embodiment of a process 500 for assigning jobs to forwarders. All or some of process 500 can be performed by scheduler 105. Process 500 begins at block 505, where credential engine 245 transmits credentials to one, more or all forwarders. At block 510, metadata engine 250 transmits configuration metadata to one, more or all forwarders. The configuration metadata can define parts of data-collection jobs (e.g., which can include formatting and transmission of the collected data) that is common across a plurality of jobs. The credentials and metadata can be transmitted, e.g., to all forwarders at setup or restart, to all forwarders upon detecting (e.g., by credential engine 245) a change in the credentials, or to a new forwarder upon addition of the new forwarder to a set of forwarders. Credential engine 245 can also cause old credentials to be wiped at a forwarder. Similarly, metadata engine 250 can also cause old metadata to be wiped at a forwarder. Credentials can be securely transmitted. Metadata can be securely transmitted as well or transmitted less securely or non-securely.

Workload segmentor 210 divides a workload into jobs at block 515. Configuration engine 255 generates a configuration token for one, more or each job at block 520. The configuration token can identify a task (e.g., type of data to collect) and a target. In some instances, this task-target identification pair is all that is included in the token. The configuration token can be generated upon dividing the workload into jobs, upon assigning the job to a forwarder (e.g., after block) or just prior to transmitting the configuration token to a forwarder.

Job assignor 220 assigns a job to a forwarder from a set of forwarders at block 525. The assignment can be based on a load on one, more or all forwarders. Status generator 240 can identify the load by requesting (and receiving a response) from one or more forwarders of a current list of uncompleted jobs, a current number of uncompleted jobs, a progress as to a completion of a job, and/or an indication that a job has been completed. Status generator 240 can, e.g., then generate a load-reflecting variable, such as an average or current latency between job assignment and initiation of job execution or job completion. In some instances, status generator 240 determines whether each of one, more or all forwarders have space to accept another job. The determination can be made based on a threshold number of tasks or jobs that can be accepted per forwarder or worker process and/or a current number of assigned and uncompleted tasks or jobs. Forwarder set manager 235 can update forwarder characteristic data store to reflect the load (e.g., to include a task count or latency).

The assignment can also or alternatively be based on a capability of one or more forwarders. Forwarder set manager 235 can also monitor forwarders' capabilities (e.g., by requesting identifications of capabilities from forwarders) and update forwarder characteristic data store 230 accordingly. The assignment can also be made to bias towards assigning the job to a forwarder who was previously assigned a related job (e.g., a job in a same workload). Job assignor 220 can retrieve information about previous related assignments from assignment data store 225.

Job assignor 220 transmits the configuration token for the assigned job to the respective forwarder at block 530. Status receiver 240 monitors a progress of the job at block 535. For example, status receiver 240 can periodically or at defined times (e.g., a fixed time after transmitting a configuration token or before making a subsequent job assignment) requesting from the forwarder an indication as to when or whether execution of the job began and/or was completed. Process 500 can then return to block 515 or block 520, to initiate assignment of another job.

Figure 6:
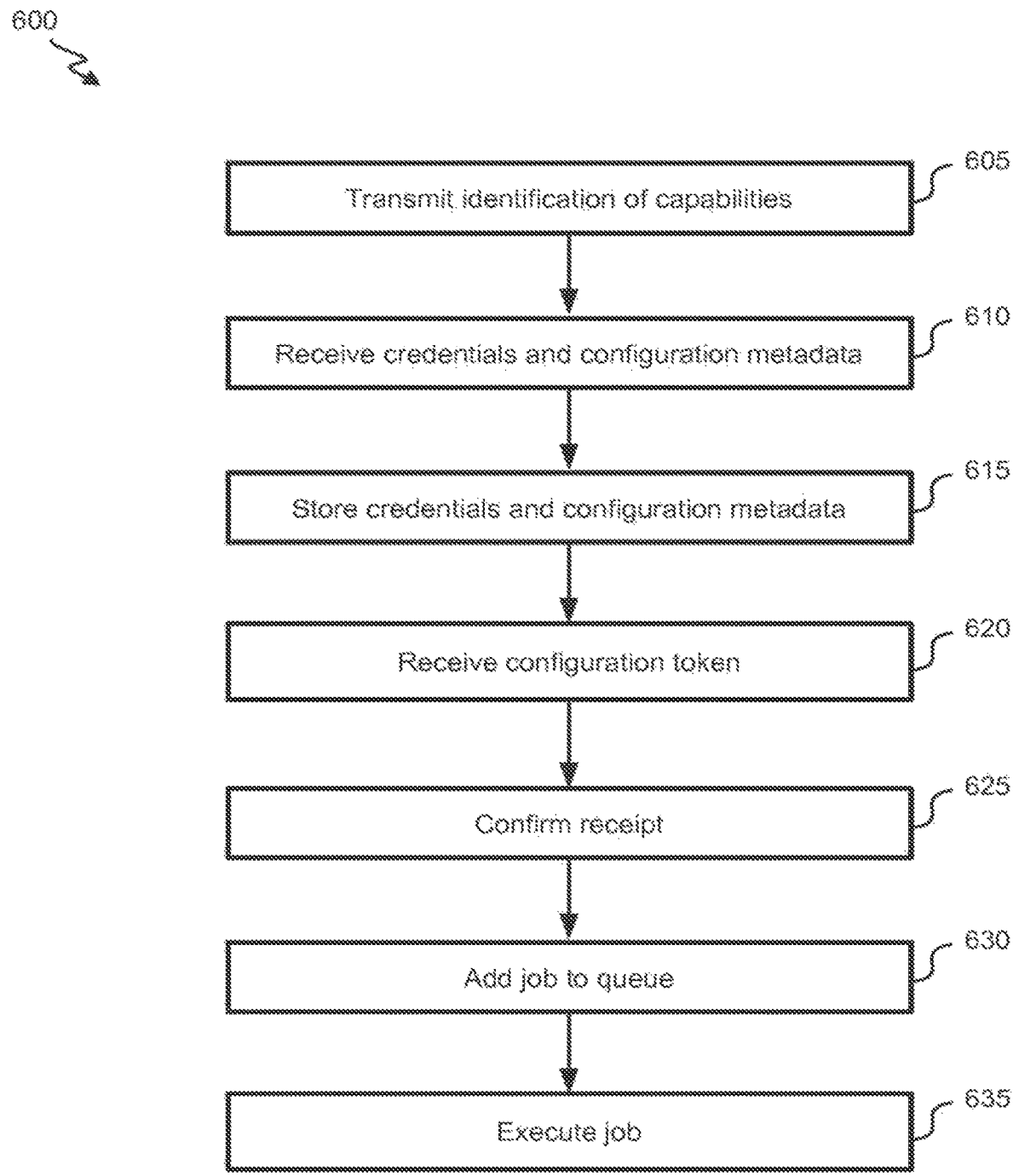
FIG. 6 illustrates a flowchart of an embodiment of a process for receiving assigned jobs and coordinating their execution.

FIG. 6 illustrates a flowchart of an embodiment of a process 600 for receiving assigned jobs and coordinating their execution. All or some of process 600 can be performed by a forwarder 110. Process 600 begins at block 605, where responder 310 transmits an identification of capabilities of the forwarder to scheduler 105. This transmission can occur in response to a request from the scheduler for the capabilities identifications and/or can occur at start-up and/or at defined intervals. Receiver 320 receives credentials and configuration metadata from scheduler 105 at block 610. Receiver 320 stores the credentials in credential data store 315 and stores the metadata in metadata data store 317 at block 615. It will be appreciated that the credentials and configuration metadata can be separately received and/or received via separate communication channels (e.g., a communication channel for the credentials being more secure than that for the metadata).

Receiver 320 receives a configuration token at block 620. In some (but not other) instances, responder 310 confirms, to scheduler 105, that the configuration token was received at block 625. (In these instances, scheduler 105 may reassign the job absent receipt confirmation.)

At block 630, receiver 320 adds an identification of each job at least partly defined in the configuration token to queue 325. The identification can include, e.g., a target identifier, a task identifier, task definitions (e.g., a type of data to collect), an expiration time, and/or a data-collection start and/or end time (which can include times pertaining to actual communications between the forwarder and target or timestamps of data to be collected).

A worker process 330 selects a handler 340 equipped to handle the job (which may include selecting a handler 340 equipped to handle the identified task) and uses the handler 340 to execute the job at block 635. In one instance, executing the job can include establishing a communication channel with a target (e.g., using appropriate credentials), requesting data as identified in the job, receiving the data and forwarding the data to an indexer 130. Job execution may further include filtering collected data and/or formatting collected data as defined in configuration metadata or the configuration token. In one instance, job execution includes verifying a validity of an established communication channel with a target (e.g., by confirming credentials or testing whether data an still be communicated over the channel), re-establishing the communication channel if the channel is no longer valid, requesting data as identified in the task, receiving the data and forwarding the data to an indexer 130.

Figure 7:
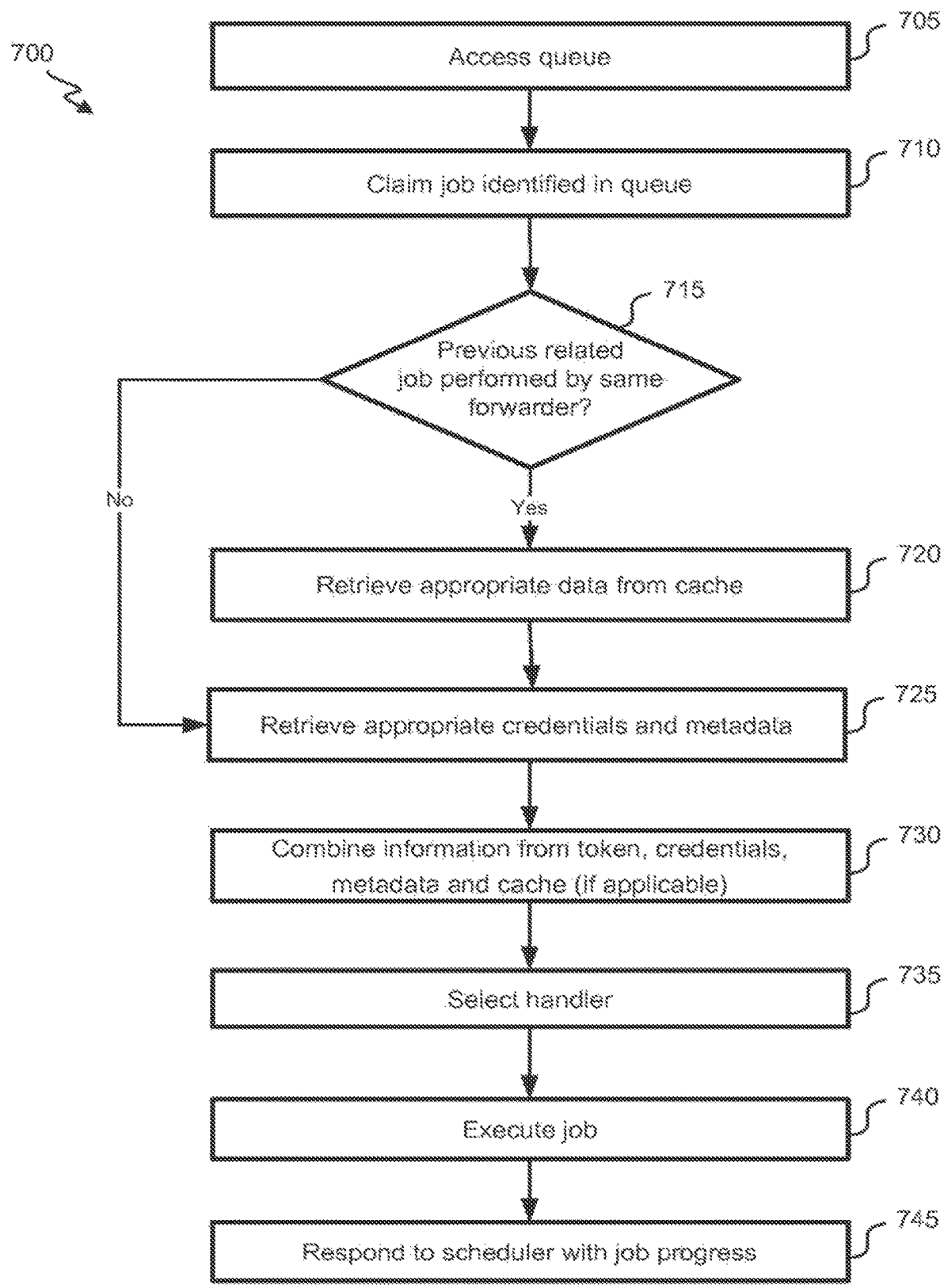
FIG. 7 illustrates a flowchart of an embodiment of a process for claiming and executing an assigned task.

FIG. 7 illustrates a flowchart of an embodiment of a process 700 for claiming and executing an assigned task. All or some of process 700 can be performed by a worker process 330. Process 700 begins at block 705, where queue communicator 335 accesses queue 325. Queue communicator 335 can access queue 325 at regular times or intervals, upon having completed a task, or having no current task to execute.

Queue communicator 335 claims a task identified in queue 325 at block 710. The claimed task can be a task at a front of the queue and/or a front-most task for which the worker process has the appropriate handler for handling.

At decision block 715, worker process 330 determines whether a previous related task (e.g., a task in a same job or workload or a task with a same target) was performed by a same forwarder. If so, worker process 330 can retrieve information from a cache stored at the forwarder. This ability can lead towards a preference for assigning related tasks to a same forwarder. The cache can include values for a field specified by a client or information to facilitate quicker data collection. For example, a cache could include a count of an occurrence of a value in data or a past state (e.g., to facilitate difference tracking).

At block 725, worker process 330 retrieves credentials associated with the job from credential data store 315 and retrieves configuration metadata associated with the job from metadata data store 317. In each instance, the data store may include general credentials and/or metadata that pertains to all jobs, and this information can be retrieved. Further or alternatively, the data may include credentials and/or metadata that is tied to specific tasks (e.g., collect web logs) or groups of tasks, to specific targets or groups of targets, and/or to specific clients or groups of clients. Worker process 330 can then identify any more specific credentials and/or metadata that applies to the job by finding credentials and/or metadata with associations that match that from the job (e.g., that matches a target identifier or task identifier).

At block 730, worker process 300 combines the retrieved metadata and credentials (and data from the cache if block 720 was performed) with any additional information present in the token. In one instance, the token merely includes a task identifier and target identifier, each of which are paired to specific configuration information in metadata data store 317. In this instance, the token may no longer provide any useful information after the appropriate configuration metadata is retrieved. Together, the combined information may form a configuration file and/or include all information needed to perform the job.

Worker process 330 can identify an appropriate handler 340 to execute the task at block 735. In some instances, each handler is associated with one or more tasks. Thus, e.g., a specific handler may be configured to execute tasks for collecting web-access data. Using the handler and the combined information, worker process 330 executes the job at block 740. In one instance, executing the task can include establishing a communication channel with a target (e.g., using appropriate credentials), requesting data as identified in the task, receiving the data, potentially filtering and formatting the data (e.g., based on configuration metadata) and forwarding the data to an indexer 130. In one instance, executing the task includes verifying a validity of an established communication channel with a target (e.g., by confirming credentials or testing whether data an still be communicated over the channel), re-establishing the communication channel if the channel is no longer valid, requesting data as identified in the task, receiving the data and forwarding the data to an indexer 130.

Queue communicator 335 reports a task progress to responder 310 at block 745, and responder 310 can then report the task progress to status receiver 240. For example, queue communicator 335 can report that the task is still waiting to be executed, that execution of the task has commenced, that a particular portion of the task has been completed or that the entire task has been completed. One or both reportings can be performed upon receiving a request for the status from scheduler 105.

Figure 8:
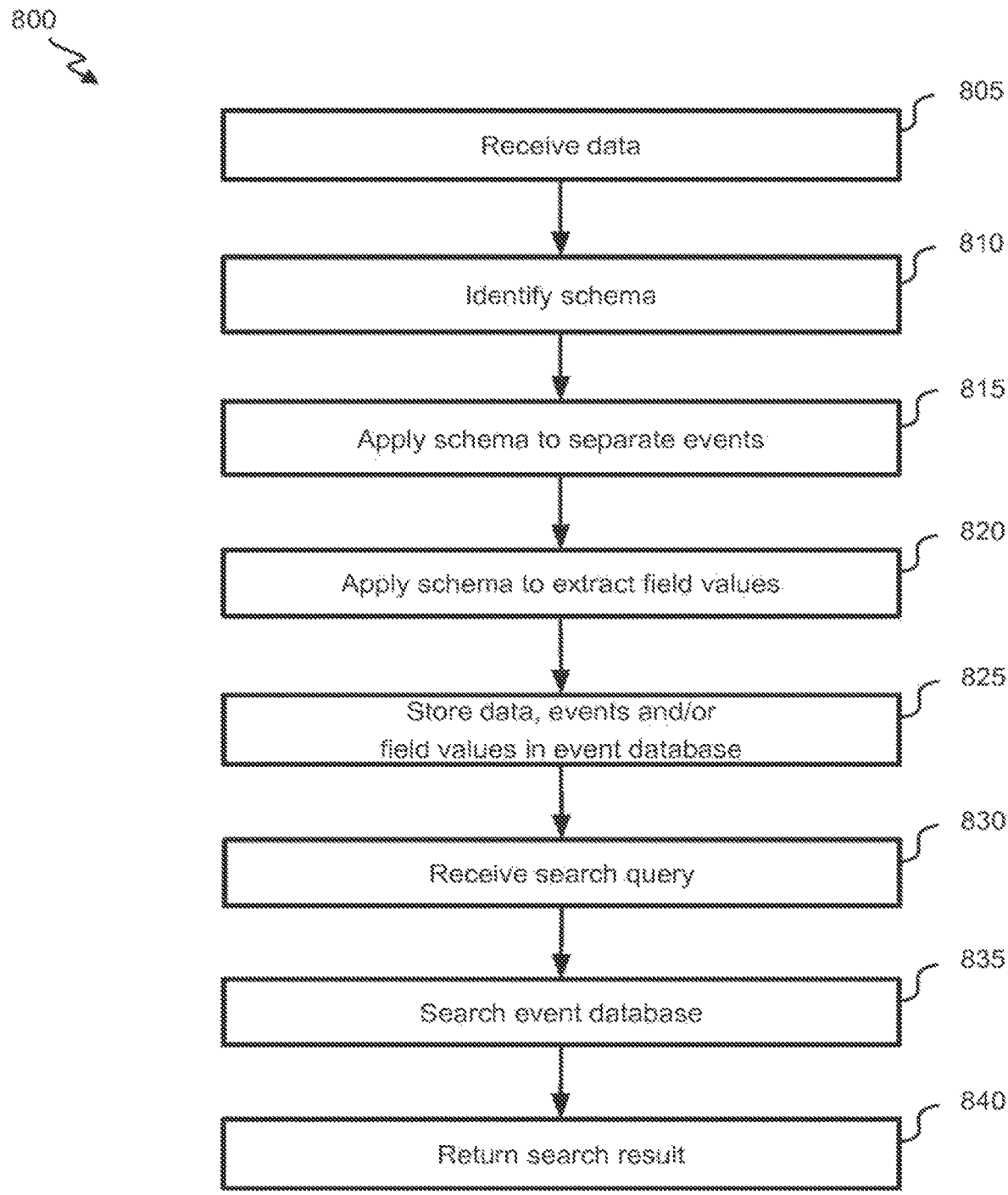
FIG. 8 illustrates a flowchart of an embodiment of a process for storing and using big data.

FIG. 8 illustrates a flowchart of an embodiment of a process 800 for storing and using Big data. Process 800 begins at block 805, where data intake 405 receives data. Schema engine 410 identifies an applicable schema at block 810. Event parser 420 applies the schema to separate the data into events at block 815. Field extractor 425 applies the schema to extract field values from the events at block 820. Storage engine 430 stores raw data, events and/or field values in event data store 140 (e.g., by assigning the data, events and/or field values to buckets based on particular field values) at block 825.

Search engine 440 receives a search query from a searcher (e.g., client or user) at block 830. The search query can include one or more criteria which can specify or constrain field values. Search engine 440 searches event data store 140 at block 835. The search can entail searching only some of event data store 140 (e.g., that include field values of interest). The search can produce identifiers of events of interest. Search engine 440 may then collect other field values for those events of interest. A search result can include the collected other field values and/or a processed version thereof. Search engine 440 returns the search result to the searcher at block 840.

It will be appreciated that forwarder 130 and/or process 800 can be modified such that schema is not bound to data (or only a portion of the schema is bound to data) immediately following intake. For example, schema could instead be bound prior to or during storage of the data or at a query time (e.g., subsequent to block 830 of process 800).

Forwarder 130, search engine 440, events data store 140 and/or process 800 can be modified to include features, feature connections and/or flows as described in Carasso, David. *Exploring Splunk Search Processing Language (SPL) Primer and Cookbook*. New York: CITO Research, 2012 and/or as described in Ledion Bitincka, Archana Ganapathi, Stephen Sorkin, and Steve Zhang. *Optimizing data analysis with a semi-structured time series database*. In SLAML, 2010. Each of these references is hereby incorporated by reference in its entirety for all purpose.

Embodiments of the subject matter and the functional operations described in this Specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a data store management system, an operating system, or a combination of one or more of them, A propagated signal is an artificially generated signal, e.g., a machine generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, architecture provider or reviewer, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
    receiving credentials, by a forwarder via a network, in a network environment that includes a plurality of forwarders configured to collect data from a respective plurality of data sources, and a plurality of indexers configured to index data collected by the plurality of forwarders for subsequent searching of indexed data;
    storing the credentials, by the forwarder;
    maintaining a plurality of worker processes in the forwarder;
    transmitting, by the forwarder to a scheduler, capabilities information including an indication of a number of the worker processes in the forwarder that can execute jobs in parallel;
    storing information relating to a plurality of jobs in a queue, each of the plurality of worker processes configured to execute at least one task from the queue;
    receiving job configuration data, by the forwarder, the job configuration data including indications of a first job including a data collection task for the forwarder to perform, a target source from which data is to be collected in the data collection task, and a particular indexer to which the forwarder is to forward the data after collection of the data from the target source, the first job having been assigned to the forwarder by the scheduler based on the indication of the number of the worker processes in the forwarder that can execute jobs in parallel;
    using, by the particular forwarder, the job configuration data and the stored credentials to execute the first job, including to collect data from the target source, wherein the data collected from the target source includes unstructured machine data; and
    transmitting, by the particular forwarder to the particular indexer, data collected from the target source according to the first job, for indexing of the data collected from the target source.

2. The method of claim 1, wherein said using the job configuration data and the stored credentials to execute the job comprises using the stored credentials to establish communication with the target source.

3. The method of claim 1, wherein said using the job configuration data and the stored credentials to execute the job comprises using the stored credentials to validate a communication channel with the target source.

4. The method of claim 1, wherein the credentials have been transmitted to the forwarder at a direction of a job scheduler in the system.

5. The method of claim 1, wherein the job configuration data further include data collection configuration parameters.

6. The method of claim 1, wherein the job configuration data further include an indication of a data filter for the forwarder to apply.

7. The method of claim 1, wherein the job configuration data comprises target configuration metadata for accessing the target source.

8. The method of claim 1, wherein the job configuration data identifies a data-request format required by a particular target source.

9. The method of claim 1, further comprising formatting, by the forwarder, the data collected from the target source.

10. The method of claim 1, wherein the job configuration data comprises target configuration metadata for accessing the target source according to the first job, the method further comprising:
receiving second job configuration data for a second job that involves accessing the target source, wherein the second job configuration data does not include the target configuration metadata.

11. The method of claim 1, wherein the job configuration data indicates a format of data output of the job.

12. The method of claim 1, wherein the job configuration data indicates an expiration deadline for initiation of execution the job.

13. The method of claim 1, wherein the job configuration data specifies at least one client preference comprising:
a format of data output of the job; and
a relative expiration deadline of initiation of execution the job.

14. The method of claim 1, wherein the job includes collection of unstructured data from the target source.

15. The method of claim 1, wherein the jobs includes collection of data from a host of a web service.

16. The method of claim 1, wherein the data collected from the target source comprises machine data.

17. The method of claim 1, wherein the data collected from the target source comprises unstructured machine data.

18. The method of claim 1, wherein the network environment further includes a scheduler to schedule a plurality of jobs on the plurality of forwarders, the scheduler executes at a first computing device, and the forwarder executes at a second computing device.

19. The method of claim 1, wherein the network environment further includes a scheduler to schedule a plurality of jobs on the plurality of forwarders, the scheduler executes at a first computing device, the forwarder executes at a second computing device, and the particular indexer executes on a third computing device.

20. The method of claim 1, further comprising transmitting, by the forwarder to a scheduler, an indication that the forwarder has completed the job.

21. The method of claim 1, further comprising:
receiving, by the forwarder, second job configuration data for a second job that involves accessing the target source, prior to the forwarder transmitting an indication that the forwarder has completed the first job.

22. The method of claim 1, wherein the method includes:
executing, by the forwarder, a job by establishing or validating a communication channel with the target source, collecting particular data from the target source based on data collection configuration parameters described by the job configuration data, formatting the collected data, forwarding the collected data to the particular indexer, and sending a communication to the scheduler to indicate that the job is complete.

23. The method of claim 1, further comprising:
sending a message from the forwarder to report a capability of the forwarder to a scheduler that is responsible for assigning data collection jobs to the plurality of forwarders.

24. The method of claim 1, wherein the forwarder receives the job configuration data in the form of a batch of job configuration tokens.

25. The method of claim 1, further comprising storing information relating to a plurality of jobs in queue.

26. The method of claim 1, wherein the forwarder receives the job configuration data in the form of a batch of job configuration tokens;
the method further comprising storing information relating to a plurality of jobs in queue.

27. An apparatus to implement a forwarder for a data acquisition, indexing and search system, the apparatus comprising:
a memory;
a network interface through which to communicate with at least one other device in a network environment that includes a plurality of forwarders configured to collect data from a respective plurality of data sources, and a plurality of indexers configured to index data collected by the plurality of forwarders for subsequent searching of indexed data; and
a processor coupled to the memory and the network interface and configured to execute operations including
receiving credentials, by the forwarder via the network;
storing the credentials, by the forwarder;
maintaining a plurality of worker processes in the forwarder;
transmitting, by the forwarder to a scheduler, capabilities information including an indication of a number of the worker processes in the forwarder that can execute jobs in parallel;
storing information relating to a plurality of jobs in a queue, each of the plurality of worker processes configured to execute at least one task from the queue;
receiving job configuration data, by the forwarder, the job configuration data including indications of a first job including a data collection task for the forwarder to perform, a target source from which data is to be collected in the data collection task, and a particular indexer to which the forwarder is to forward the data after collection of the data from the target source, the first job having been assigned to the forwarder by the scheduler based on the indication of the number of the worker processes in the forwarder that can execute jobs in parallel;
using, by the particular forwarder, the job configuration data and the stored credentials to execute the first job, including to collect data from the target source, wherein the data collected from the target source includes unstructured machine data; and
transmitting, by the particular forwarder to the particular indexer, data collected from the target source according to the first job, for indexing of the data collected from the target source.

28. A non-transitory machine-readable storage medium having stored therein instructions, execution of which in a processing device causes the processing device to perform operations of a forwarder in a network environment that includes a plurality of forwarders configured to collect data from a respective plurality of data sources, and a plurality of indexers configured to index data collected by the plurality of forwarders for subsequent searching of indexed data, the operations of the forwarder comprising:
receiving credentials via a network;
storing the credentials;
maintaining a plurality of worker processes in the forwarder;

transmitting, by the forwarder to a scheduler, capabilities information including an indication of a number of the worker processes in the forwarder that can execute jobs in parallel;

storing information relating to a plurality of jobs in a queue, each of the plurality of worker processes configured to execute at least one task from the queue;

receiving job configuration data, the job configuration data including indications of a first job including a data collection task for the forwarder to perform, a target source from which data is to be collected in the data collection task, and a particular indexer to which the forwarder is to forward the data after collection of the data from the target source, the first job having been assigned to the forwarder by the scheduler based on the indication of the number of the worker processes in the forwarder that can execute jobs in parallel;

using the job configuration data and the stored credentials to execute the first job, including to collect data from the target source, wherein the data collected from the target source includes unstructured machine data; and transmitting, to the particular indexer, data collected from the target source according to the first job, for indexing of the data collected from the target source.

\* \* \* \* \*